United States Patent Office 2,729,881
Patented Jan. 10, 1956

2,729,881
COMPOSITE METAL ARTICLE OF CHROME STEEL AND PLATINUM COMPONENTS

Max Joseph Stumbock, South Orange, N. J., assignor to Baker & Co., Inc., Newark, N. J., a corporation of New Jersey No Drawing. Application June 20, 1951,
Serial No. 232,667

1 Claim. (Cl. 29—196.3)

The invention involved herein is directed to the art of the joining of metal parts at least one of which is made of an alloy containing chromium, and is more specially directed to a bonding of said metal parts with a braze or filler material.

An object of the invention is to enable a strong joinder of chrome alloy metal parts. A further object is to present a method for joining alloys containing chrome. Another object is to prevent the formation of chromium oxide during the brazing operation in joining alloys containing chrome.

Difficulty has been experienced in the joining of metal parts made of an alloy containing chromium. Such alloys for example include chromium-nickel stainless steels with a nickel content of from 0% to 25%, 80–20 NiCr or nickel chromium and iron; and also certain heat resisting alloys containing up to 80% Ni with smaller percentages of iron and chrome. It has been found in joining such metal parts as by soldering or brazing, that a tenacious film of chromium oxide forms on the surface of the parts making joinder difficult, if not impossible, even when carried out in a reducing atmosphere and with the assistance of an active flux. Any solder used for this purpose must therefore have excellent wetting and flowing characteristics. Such metal parts in use are subjected to high service temperatures. Therefore any solder, brazing or filler material for joining said metal parts must also possess the requisite strength, creep resistance and scaling resistance at the service temperature.

Even where a metal part of gold or platinum alloys, which in themselves do not at all, or only very slightly oxidize, is to be joined to a metal part containing chrome, the oxidation of chrome occurs.

It is now proposed according to my method to join such metal parts by furnace brazing under a reducing atmosphere of pure hydrogen or cracked ammonia. It is also necessary to maintain the dewpoint at −100° F. or lower of the atmosphere (i. e. hydrogen) and also to remove the least traces of $O_2$ as by chemical cleaning, hydrogen reduction or the like since the presence of even very small amounts of water vapor results in low partial pressures of water vapor or oxygen thus presenting an oxidizing atmosphere in which the surfaces to be brazed are then not wet by the brazing materials. In requiring the dewpoint to be maintained at −100° F. or lower it is implied that any water present is removed. This can be accomplished in a conventional manner, e. g. by using dryers usually filled with aluminum oxide pellets. Such a method of joinder accompanied by proper preparations, such as cleaning, nickel-plating, etc., make possible the reliable joining of the high chrome irons without the use of a flux. However, the quality of such a brazed joint depends upon the quality of the brazing material which has been used. Heretofore, silver solder alloys (i. e. Ag-Cu alloys), or pure copper has been used as the solder material. All of these solders have the disadvantage of having a melting point at or below the melting point of copper (M. P.=1083° C.). Therefore, where under desired use a combination of metal parts is subjected to temperatures of 1100° C. and above, it has been found that the joints will flow. Moreover, copper-brazed joints in combination with platinum alloys have the further disadvantage that at such elevated temperatures the copper rapidly diffuses into the platinum, which diffusion destroys the bond and changes the platinum alloy. Furthermore, this diffusion occurring during brazing (or subsequent heating over 1000° C.) also reduces the fluidity of the brazing compound making it difficult to get a complete wetting of the surfaces to be joined and further weakens such joints so that any subsequent machining, such as turning or forming, is likely to break the joints apart.

In accordance with the present invention the M. P. of the solder or braze material is raised and all of the above mentioned disadvantages are overcome by employing a filler material of a palladium-copper alloy.

The affinity of palladium and copper to steel as well as to platinum alloys makes them ideally suited for high temperature use.

The range of the alloy constituents is as follows:

|   | Percentage |
|---|---|
| Copper | 20 to 60 |
| Palladium | 80 to 40 |

A specific formula for an alloy of the brazing type which is desirable for the purposes mentioned is as follows:

|   | Percent |
|---|---|
| Copper | 40 |
| Palladium | 80 |

It has been found that in the annealed condition a maximum hardness of about 120 BHN occurs at 40% Cu–60% Pd, and a hardness of 255 BHN occurs for this composition when cold rolled 66%. This specific composition also is notable for long life and smooth wear. Furthermore, the limited percentage of copper indicated above is no longer free but already alloyed and hence its diffusion into platinum when a platinum alloy is to be joined is prevented. The use of more than 60% copper tends to result in diffusion of the copper.

The range of melting points for the brazing compound from 1380° C. for 20% Cu 80% Pd to 1150° C. for 60% Cu 40% Pd makes it possible to choose a palladium copper alloy most suitable for the high temperature use required. The preferred alloy of 60% Pd 40% Cu has a melting point near 1200° C. and is found to readily flow over the faces of the parts to be joined and even into the smallest openings.

Metal parts joined according to my invention have been found to be readily machinable and have even permitted cutting operations across the joint itself without failure.

What I claim is:

A composite metal article made up of two or more independently formed metal parts having two abutting metal surfaces, one of said parts having an abutting surface being a chrome steel alloy and the other of said abutting parts being of a platinum alloy, the combination therewith of a binary brazing alloy between said surfaces and bonded thereto consisting of 60% Pd and 40% Cu and having a melting point of about 1200° C.

References Cited in the file of this patent

UNITED STATES PATENTS

| 1,931,704 | Moore | Oct. 24, 1933 |
| 2,085,587 | Hotchkiss | June 29, 1937 |
| 2,126,074 | Wissler | Aug. 9, 1938 |
| 2,156,306 | Rapatz | May 2, 1939 |
| 2,189,640 | Powell | Feb. 6, 1940 |
| 2,226,944 | Reeve | Dec. 31, 1940 |
| 2,426,467 | Nelson | Aug. 26, 1947 |
| 2,654,946 | Rhodes et al. | Oct. 13, 1953 |

FOREIGN PATENTS

| 487,263 | Great Britain | June 17, 1938 |
| 573,176 | Great Britain | Nov. 9, 1945 |
| 591,343 | Great Britain | Aug. 14, 1947 |